Sept. 29, 1942.　　　　P. LAUX　　　　2,297,566
BIRD PERCH CLEANER
Filed Jan. 16, 1941

Peter Laux
INVENTOR.
BY Milo B. Stevens & Co.
ATTORNEYS.

Patented Sept. 29, 1942

2,297,566

UNITED STATES PATENT OFFICE 2,297,566

BIRD PERCH CLEANER

Peter Laux, Chicago, Ill.

Application January 16, 1941, Serial No. 374,774

5 Claims. (Cl. 30—169)

My invention relates to bird cage perches, and more particularly to devices for keeping the same clean, and one of my objects is to provide a device of this kind which is easily insertible through the cage to clean the perch, so that the door of the cage need not be opened for access to the perch.

A further object of the invention is to provide a device which is shaped for the quick and thorough cleaning of the perch by a simple movement of the device on the same.

Another object of the invention is to design the novel perch cleaner in the manner of an arched scraper which fits the perch closely and is therefore best suited to thoroughly clean the same.

An important object of the invention is to construct the novel cleaner from one piece of wire rod, making the same inexpensive to produce, easy to handle and compact to keep, store or ship.

With the above objects in view and any others which may suggest themselves from the description to follow, a better understanding of the invention may be had by reference to the accompanying drawing, in which—

Figures 1, 2, 3, 4:
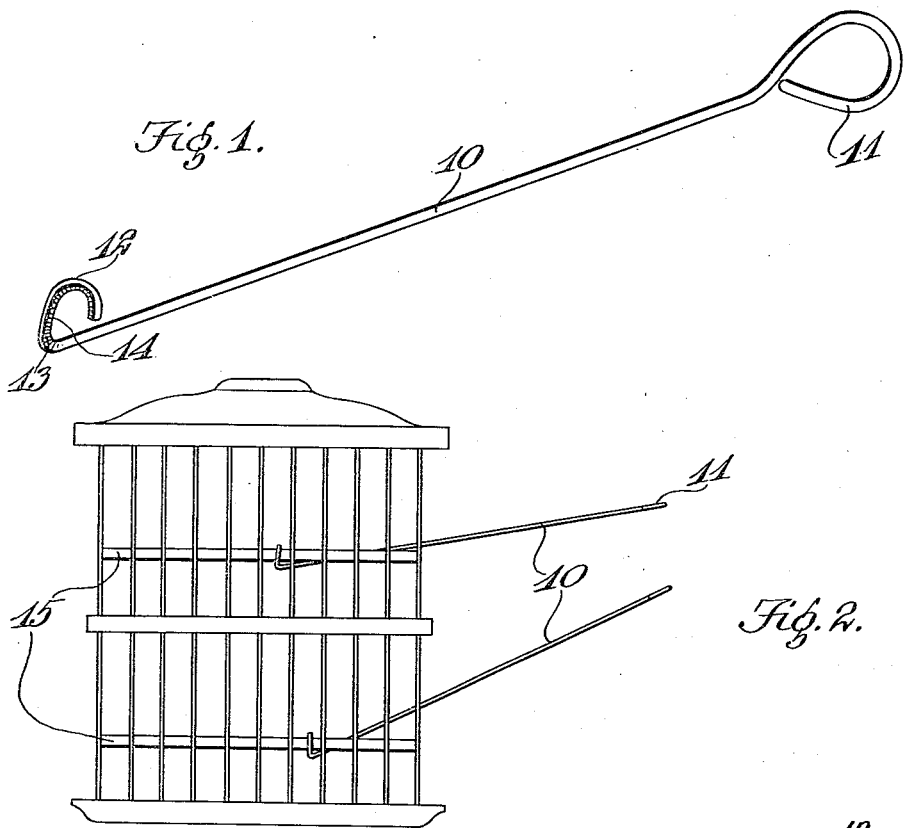
Fig. 1 is a perspective view of the cleaner.
Fig. 2 is an elevation of a bird cage, showing two modes of applying the cleaner.
Fig. 3 is an enlarged elevation of a perch fragment, showing a portion of the cleaner in section.
Fig. 4 is a complete section taken on the line 4—4 of Fig. 3.

In order to keep the perches in a bird cage in a sanitary condition, it is proper to clean them frequently. In such event, various appliances have been used, but those which have come to my knowledge are of such form or size that the door of the cage must be opened in order to gain access with the cleaning device to one perch or the other. Obviously, this either requires the release of the bird or birds from the cage or involves fright or discomfort to the same while the cleaning operation is in progress. It has therefore been my intention to devise a cleaner which not only permits the cage to remain closed, but also limits the position of the cleaner to the zone of the perch being cleaned, so that a minimum of interference with the environment in the cage is caused.

In accordance with the foregoing, specific reference to the drawing indicates that the cleaner 10 is basically a length of wire rod, actually about an eighth of an inch thick. One end portion of the rod is looped as indicated at 11 to form a handle, while the other is bent sidewise with an arch 12. The outer leg of the latter is substantially shorter than the inner one, limiting the outer portion of the arch to substantially a half circle. While the rim or outer portion of the arch is rounded as a continuation of the stock of the rod 10, the inner portion of the arch is beveled from both sides as indicated at 13 to terminate in a fairly sharp edge 14. Also, the plane of the arch is somewhat inclined toward the rear, so as to make less than a right-angle with the rod 10.

The arch 12 is so dimensioned and curved that it conveniently fits over the conventional perch rod 15 as indicated in Fig. 4. When in this position the longitudinal forth-and-back movement of the cleaner with a small amount of the pressure on the perch will scrape the same clean. The cleaner being of a length of wire is easily insertible through the bars 16 of the conventional bird cage. When the upper perch is negotiated, the angle of the cleaner will be fairly gradual, as indicated at A in Fig. 2, so that the arch and scraper 14 are substantially vertical and therefore in a position to operate efficiently. However, when the lower perch is negotiated and the scraper is held in the position indicated at B the backward tilt of the arch enables the scraper to still maintain a pushing rather than a dragging position, facilitating the removal of hardened deposits, dirt or foreign matter.

It will be evident from the above description that I have devised a scraper which is at first sight extremely simple, being constructed from a single piece of wire rod. Its handle 11 is not only useful for holding purposes but also to hang the scraper on a nail or wall hook or a projection of the cage when its use is not desired. Further, the forward portion of the scraper is of a nature to be trained or passed between the bars of a bird cage with no difficulty and precisely in the zone of the chosen perch, leaving the rest of the cage undisturbed. Further, the action of the scraper is longitudinal of the perch, confining the scraper to the zone thereof. Finally, the scraper is designed in a peculiar manner to adapt it to both high and low perches without inconvenience to the attendant, and is formed to obtain a highly efficient cleaning operation.

While I have described the invention along specific lines, various minor changes and refinements may be made without departing from its principle, and I desire to consider all such changes and refinements as coming within the scope and spirit of the appended claims.

I claim:

1. A cleaner for a bird cage perch, the latter being a stick of circular cross-section, comprising a rod formed at one end with a scraper, and the latter having an arched form dimensioned to fit the curvature of said stick when mounted transversely upon the same, the rod being of circular cross-section, the scraper being a continuation of the rod, and the inner portion of the scraper being tapered to an edge.

2. A cleaner for a bird cage perch, the latter being a stick of circular cross-section, comprising a rod formed at one end with a scraper, and the latter having an arched form dimensioned to fit the curvature of said stick when mounted transversely upon the same, the scraper being an arch bent laterally from the rod.

3. A cleaner for a bird cage perch, the latter being a stick of circular cross-section, comprising a rod formed at one end with a scraper, and the latter having an arched form dimensioned to fit the curvature of said stick when mounted transversely upon the same, the scraper being an arch bent laterally from the rod and in a plane tilted toward the same.

4. A cleaner for a bird cage perch, the latter being a stick of circular cross-section, comprising a rod formed at one end with a scraper, and the latter having an arched form dimensioned to fit the curvature of said stick when mounted transversely upon the same, the rod being of circular cross-section, the scraper being an arch bent laterally from the rod, and the arch being chamfered from the sides to form its inner portion into a relatively sharp and arch-shaped edge.

5. A cleaner for a bird cage perch, the latter being a stick of circular cross-section, comprising a rod formed at one end with a scraper, and the latter having an arched form dimensioned to fit the curvature of said stick when mounted transversely upon the same, the rod being of circular cross-section, the scraper being an arch bent laterally from the rod, and the arch being chamfered from the sides at equal angles to form its inner portion into a relatively sharp and arch-shaped edge extending centrally along the inside of the arch.

PETER LAUX.